(12) United States Patent
Kim et al.

(10) Patent No.: US 8,221,830 B2
(45) Date of Patent: Jul. 17, 2012

(54) METHOD OF MANUFACTURING CELLULOSE ELECTRODE FOR FUEL CELLS, CELLULOSE ELECTRODE MANUFACTURED THEREBY, AND USE OF CELLULOSE FIBERS AS FUEL CELL ELECTRODES

(75) Inventors: Hee Yeon Kim, Daejon (KR); Seong Ok Han, Daejon (KR); Hong Soo Kim, Daejeon (KR); Nam Jo Jeong, Daejeon (KR)

(73) Assignee: Korea Institue of Energy Research, Daejeon (KR)

( * ) Notice: Subject to any disclaimer, the term of this patent is extended or adjusted under 35 U.S.C. 154(b) by 745 days.

(21) Appl. No.: 12/207,362

(22) Filed: Sep. 9, 2008

(65) Prior Publication Data

US 2009/0068545 A1    Mar. 12, 2009

(51) Int. Cl.
  *B05D 5/12* (2006.01)
  *C23C 16/00* (2006.01)
(52) U.S. Cl. ........ 427/113; 427/115; 427/121; 427/122; 427/249.3
(58) Field of Classification Search .................. 427/115, 427/113, 121, 122, 249.3
  See application file for complete search history.

(56) References Cited

U.S. PATENT DOCUMENTS

| 3,663,173 | A |   | 5/1972  | Ross |             |
|-----------|---|---|---------|------|-------------|
| 4,938,942 | A | * | 7/1990  | Gorman et al. | 423/448 |
| 4,961,415 | A | * | 10/1990 | Radwanski et al. | 131/332 |
| 2004/0018416 | A1 | * | 1/2004 | Choi et al. | 429/44 |
| 2004/0167014 | A1 | * | 8/2004 | Yan et al. | 502/101 |
| 2006/0286434 | A1 |   | 12/2006 | Evans et al. | |
| 2008/0199696 | A1 |   | 8/2008  | Kim et al. | |

FOREIGN PATENT DOCUMENTS

| EP | 1667271 B1 | | 3/2010 |
| JP | 2001-040548 | * | 2/2001 |
| JP | 2001040548 | | 2/2001 |
| WO | WO 2006/080702 | * | 8/2006 |
| WO | WO2006080702 A1 | | 8/2006 |

OTHER PUBLICATIONS

Official Search Report and Written Opinion of the European Patent Office in counterpart foreign Application No. 08164042.7, filed Oct. 9, 2008.

Lee et al.: "Progress in the synthesis of carbon nanotube and nanofiber-supported Pt electrocatalyysts for PEM fuel cell catalysis," Journal of Applied Electrochemistry, Kluwer Academic Publishers, DO, vol. 36, No. 5, May 1, 2006.

* cited by examiner

*Primary Examiner* — Brian K Talbot
(74) *Attorney, Agent, or Firm* — Kinney & Lange, P.A.

(57) ABSTRACT

Disclosed is a novel cellulose electrode having high performance, which is capable of substituting for carbon paper used as a conventional fuel cell electrode. A method of manufacturing the cellulose electrode includes cutting cellulose fibers to a predetermined length and binding the fibers, or directly weaving the fibers, thus producing a cellulose sheet, directly growing carbon nanotubes on the cellulose sheet, and supporting a platinum nano-catalyst on the surface of the carbon nanotubes using chemical vapor deposition. An electrode including the cellulose fibers and use of cellulose fibers as fuel cell electrodes are also provided. As a novel functional material for fuel cell electrodes, porous cellulose fibers having micropores are used, thereby reducing electrode manufacturing costs and improving electrode performance.

14 Claims, 8 Drawing Sheets

METHOD OF MANUFACTURING CELLULOSE ELECTRODE FOR FUEL CELLS, CELLULOSE ELECTRODE MANUFACTURED THEREBY, AND USE OF CELLULOSE FIBERS AS FUEL CELL ELECTRODES

BACKGROUND OF THE INVENTION

1. Field of the Invention

The present invention relates in general to a method of manufacturing a cellulose electrode by growing carbon nanotubes on the surface of a cellulose sheet produced from cellulose fibers and supporting a platinum nano-catalyst thereon using chemical vapor deposition (CVD), and more particularly, to a method of manufacturing a cellulose electrode having a platinum nano-catalyst supported thereon, which includes producing a cellulose sheet from cellulose fibers having a plurality of micropores, directly growing carbon nanotubes on the cellulose sheet, and supporting a platinum nano-catalyst on the carbon nanotubes directly grown on the cellulose sheet, to a cellulose electrode having a platinum catalyst supported thereon, which is manufactured through the above method, and to use of cellulose fibers as fuel cell electrodes.

2. Description of the Related Art

Typically, cellulose fibers are widely used as a lightweight composite material, an adsorption and filtration material, or a reinforcing agent, due to greatly superior intrinsic properties in terms of surface area, porosity, and physical strength. However, research into the use of cellulose fibers as a material for fuel cell electrodes through a series of procedures has not yet been performed domestically or abroad. At present, because carbon paper available as an electrode is manufactured from carbon fibers which are relatively expensive, the development of inexpensive electrode material substitutable therefor is urgent.

Korean Patent Application No. 10-2007-0015801, filed by the present inventors, discloses a technique for using carbon paper as fuel cell electrodes by directly growing carbon nanotubes on the surface of carbon paper and then supporting a platinum nano-catalyst on the carbon nanotubes using CVD. The present invention, which further improves such fuel cell electrodes, is directed to a technique for using a cellulose fiber sheet as a high functional/inexpensive material, which is substitutable for the carbon paper.

Carbon nanotubes have superior electrical conductivity, specific surface area, and hydrogen storage performance, and are expected to be useful as a catalyst support. In particular, use of carbon nanotubes as a support of a platinum catalyst for fuel cell electrodes is preferable. Research into carbon nanotubes to date is mainly concerned with the synthesis thereof, and studies on the application thereof are very poor. Further, attempts to apply carbon nanotubes as a catalyst support are very few. However, because the carbon nanotubes have a specific surface structure, they can prevent the aggregation of metal particles when supported with the metal particles.

A catalyst made of platinum which is a noble metal is mainly used for various hydrogenation and reforming reactions, and exhibits activity superior to other metal catalysts, but is problematic in terms of high preparation costs. Thus, in order to overcome these problems, the size of the platinum particles, which are a catalytic active phase, is minimized on a nano-scale, and platinum is supported in a high dispersion state, whereby platinum should be used in a minimum amount to maximize the number of catalytic active sites. To this end, the surface area of the support that supports the catalyst should be very large, and further, in the supporting procedure, the catalyst particles should not be aggregated on the surface of the support.

Presently, in an electrode manufacturing process, various carbon materials are used as the support for the platinum catalyst, but examples using carbon nanotubes have not yet been introduced. In the case where carbon nanotubes are used as the catalyst support for fuel cell electrodes, the performance of the electrode may be greatly increased thanks to superior properties of the carbon nanotubes, including electrical conductivity, hydrogen storage performance, mechanical strength, and surface area.

In a conventional fuel cell electrode manufacturing process, a so-called 'pasting method' for applying a platinum-supported carbon catalyst on carbon paper is adopted. In this procedure, the active sites of the platinum catalyst are disadvantageously blocked with each other. On the other hand, in the case where the carbon nanotubes are directly grown on the surface of the electrode and then platinum is supported, a large surface area of the carbon nanotubes may be used as it is, and all of the platinum catalyst particles supported thereon are not blocked but participate in the reaction, greatly increasing the reactive activity.

To date, there are no examples in which only cellulose fibers are used as a material for fuel cell electrodes. Similarly, US Patent Application Publication No. 2006/0286434 A1 discloses that an electrically conductive carbonaceous material is incorporated into a cellulose matrix to thus prepare a cellulose composite, which is then used to form fuel cell electrodes.

Literature related to the growth of carbon nanotubes on the surface of carbon electrodes for use as fuel cell electrode is as follows. That is, Japanese Patent Application Publication No. 2004-59428A discloses a method of manufacturing carbon nanotube electrodes for use as fuel cell electrodes, which includes dispersing a metal catalyst on a carbon substrate through electrophoresis, spray coating, sputtering or CVD, and synthesizing carbon nanotubes using as a carbon source ethylene, carbon monoxide, carbon dioxide, acetylene, and methane through CVD at 400~900□, or synthesizing carbon nanotubes using plasma-enhanced CVD.

In addition, PCT Publication No. WO 2006/080702 A1 discloses that a nano composite including carbon nanotubes is prepared and is then used for fuel cell electrodes, thereby greatly increasing performance of the fuel cell. According to the above patent, the carbon nanotubes are synthesized by supporting iron, nickel, cobalt or alloys thereof on carbon cloth or carbon fiber through sputtering, evaporation, CVD, electroplating, or electroless plating, and then supplying a carbon source thereto. As such, DC plasma-enhanced CVD is used so that primary carbon nanotubes and additional carbon nanotubes which are grown in the form of branches on the primary nanotubes are separated from each other by a predetermined interval.

In a search of the literature, no examples are found in which carbon nanotubes are directly grown on a cellulose fiber sheet and then platinum catalyst nanoparticles are highly dispersed thereon, thus obtaining a cellulose electrode, which is used as fuel cell electrodes.

SUMMARY OF THE INVENTION

Leading to the present invention, thorough research aiming to solve the problems encountered in the related art, carried out by the present inventors, resulted in the finding that, when cellulose fibers, which are relatively inexpensive, are used, electrode manufacturing costs may be drastically reduced and the cellulose fibers may be used as a novel eco-friendly nano-bio hybrid material.

Therefore, the present invention is intended to develop novel fuel cell electrodes having high performance/low price, in which the manufacturing cost of fuel cell electrodes is reduced using a material less expensive than a material for conventional carbon paper electrodes, and also to develop a novel eco-friendly nano-bio hybrid material.

The present invention provides a method of manufacturing a cellulose electrode, which can be used instead of conventional carbon paper electrodes, by producing a cellulose sheet from cellulose fibers having a plurality of micropores, uniformly doping the surface thereof with a metal catalyst, growing carbon nanotubes having a predetermined thickness to a high density and in a high dispersion state, and supporting platinum catalyst nanoparticles in a high dispersion state on the surface of the carbon nanotubes through CVD, in order to realize availability as fuel cell electrodes.

Below, the present invention is described in detail.

The present invention provides a method of manufacturing a cellulose electrode having a platinum nano-catalyst supported thereon, comprising splitting cellulose fibers, thus producing a cellulose sheet, growing carbon nanotubes on the cellulose sheet, and supporting a platinum nano-catalyst on the carbon nanotubes grown on the cellulose sheet. Specifically, the method of manufacturing the cellulose electrode having a platinum nano-catalyst supported thereon may comprise splitting cellulose fibers into fibers on a micrometer scale, cutting the split fibers to a predetermined length, and subjecting the cut fibers to binding, drying and pressing to a sheet, thus producing a cellulose sheet; doping the cellulose sheet with a catalyst metal for growing carbon nanotubes, and supplying a carbon source to the cellulose sheet, thus directly growing carbon nanotubes on the cellulose sheet using CVD; and pretreating the cellulose sheet having the carbon nanotubes grown thereon with an acid, and supporting a platinum nano-catalyst on the carbon nanotubes grown on the cellulose sheet through CVD.

Below, the manufacturing method according to the present invention is described in more detail.

$1^{st}$ Step: Production of Cellulose Sheet

The production of the cellulose sheet from the split cellulose fibers may be variously conducted, and includes (A) (A-1) cutting and binding the cellulose fibers or (A-2) weaving the cellulose fibers, thus producing the cellulose sheet, and (B) pretreating the cellulose sheet for use as a carbon electrode for fuel cells.

In (A-1), the cellulose fibers are split into microfibers having a diameter of tens to hundreds of □, cut to a predetermined length, coated with an adhesive, and then pressed, thus producing the cellulose sheet.

In (A-2), the cellulose fibers themselves are woven in the form of cloth, thus producing the cellulose sheet. The cellulose fibers should be split as fine as possible so as to be used for fuel cell electrodes. As the diameter of the fibers is smaller, the cellulose fibers may be woven in the form of cloth having a denser structure. In the present invention, the fibers are split on a micrometer scale (a diameter of tens to hundreds of □) due to the properties thereof. Depending on the end use, the woven cellulose sheet may be used alone or may be used in such a manner that two or three woven cellulose sheets are stacked and pressed, thereby controlling the surface area and porosity required to support the catalyst and also adjusting the reaction route in the fuel cell electrode reaction.

(B) Pretreatment of Cellulose Sheet

This is a pretreatment process for using the cellulose electrode made from the cellulose fibers as fuel cell electrodes. Through thermal treatment, impurities are removed from the cellulose fibers, and thus the wall thickness of only the fibers is decreased, and the spaces in which the impurities have been present are maintained in the form of internal pores. Through treatment with an aqueous sulfuric acid solution, the wettability of the surface of the cellulose electrode may be increased.

$2^{nd}$ Step: Growth of Carbon Nanotubes

In order to use the cellulose electrode obtained through (A) as fuel cell electrodes, the cellulose sheet is doped with the catalyst metal for growing carbon nanotubes, and then a carbon source is supplied to the cellulose sheet, thus growing the carbon nanotubes thereon. The growth of the carbon nanotubes includes (C) doping with the catalyst metal and (D) growth of the carbon nanotubes using the carbon source.

(C) Doping with Catalyst Metal for Growing Carbon Nanotubes

In order to grow the carbon nanotubes on the surface of the cellulose electrode, which is pretreated, the cellulose electrode is doped with catalyst metal particles, for example, nickel, cobalt, iron or metal mixture particles thereof. To this end, either (C-1) immersing the pretreated cellulose electrode in an aqueous precursor solution in which nitrate or acetate of nickel, cobalt, iron, or a mixture thereof is dissolved and performing sonication, or (C-2) performing an electrochemical method for doping the metal particles may be selectively carried out.

(D) Growth of Carbon Nanotubes

The carbon source is supplied on the surface of the cellulose electrode doped with the catalyst metal for growing carbon nanotubes, thus growing the carbon nanotubes thereon. The metal of the cellulose electrode doped with nickel, cobalt or the like as the catalyst for growing carbon nanotubes is reduced, after which the carbon source, such as methane, benzene, ethanol, xylene, etc., is allowed to flow, thus growing the carbon nanotubes.

$3^{rd}$ Step: Supporting of Platinum Nano-Catalyst on Carbon Nanotubes

The supporting of the platinum nano-catalyst includes (E) performing pretreatment for removing the catalyst metal for growing carbon nanotubes from the surface of the cellulose electrode, and (F) supporting the platinum nano-catalyst.

(E) Pretreatment for Supporting of Platinum Nano-Catalyst

In order to remove the catalyst metal for growing carbon nanotubes, such as nickel, cobalt or the like, from the carbon nanotubes grown on the surface of the cellulose electrode, hydrochloric acid treatment, water washing, and drying are conducted, after which treatment with an acid mixture (nitric acid+sulfuric acid) solution is conducted to increase surface wettability of the carbon nanotubes, to substitute an oxidizing group, and to make defects necessary for effective deposition of the catalyst, and water washing and drying are carried out.

(F) Supporting of Platinum Nano-Catalyst on Carbon Nanotubes

A gaseous platinum precursor is allowed to flow to the carbon nanotubes grown on the surface of the cellulose electrode, after which the platinum nano-catalyst is supported thereon using CVD.

Through such a series of procedures, the cellulose electrode for fuel cells having the platinum nano-catalyst supported thereon according to the present invention is manufactured.

In addition, according to the present invention, a cellulose electrode having a platinum nano-catalyst supported thereon may comprise a cellulose sheet, carbon nanotubes directly grown on the cellulose sheet, and platinum nanoparticles supported on the surface of the carbon nanotubes.

DESCRIPTION OF THE PREFERRED EMBODIMENTS

Hereinafter, a detailed description will be given of a method of manufacturing a cellulose electrode according to the present invention, with reference to the appended drawings.

Figure 1:
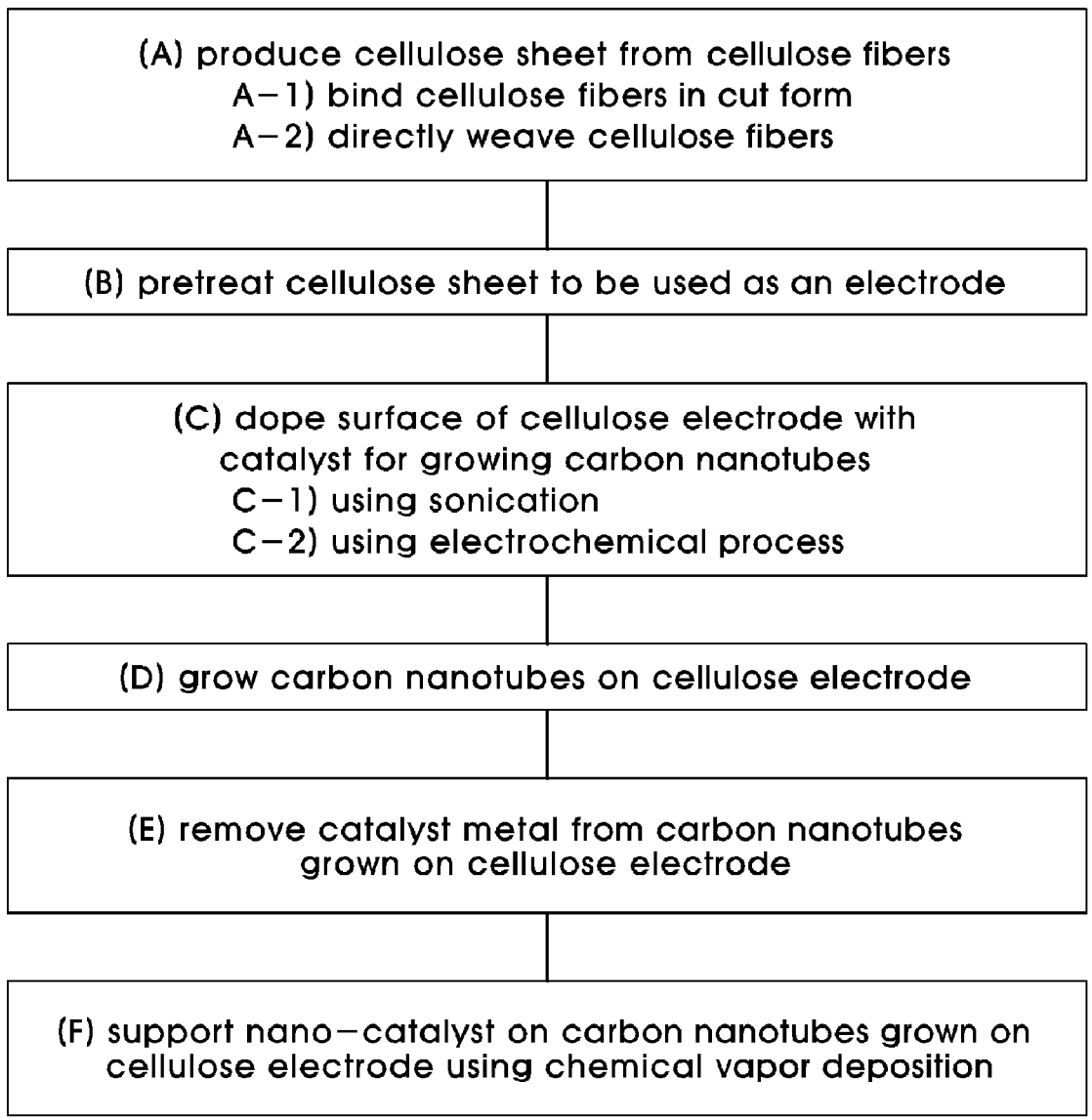
FIG. 1 is a flowchart for schematically showing a manufacturing process according to the present invention.

FIG. 1 schematically shows the manufacturing process according to a preferred embodiment of the present invention.

The manufacturing process includes (A) (A-1) subjecting the cellulose fibers to cutting, binding using an adhesive, and pressing to a sheet, or (A-2) weaving the cellulose fibers in the form of a cloth, thus producing a cellulose sheet, (B) pretreating the cellulose sheet using heat under flow of a specific gas in order to use the cellulose sheet as an electrode, (C) doping the pretreated cellulose electrode with catalyst metal particles for growing carbon nanotubes, such as nickel, cobalt, iron or metal mixture particles thereof using (C-1) a sonication process or (C-2) an electrochemical process, (D) supplying a gaseous carbon source to the surface of the cellulose electrode and maintaining a predetermined temperature, thereby growing the carbon nanotubes on the cellulose electrode, (E) removing the catalyst metal, such as nickel, cobalt, iron or metal mixture thereof, from the carbon nanotubes grown on the surface of the cellulose electrode, and pretreating the surface of the carbon nanotubes to be supported with platinum, and (F) supporting a platinum nano-catalyst on the carbon nanotubes grown on the cellulose electrode using a gaseous platinum precursor through CVD.

More specifically, (A) is a process of producing the cellulose fibers in the form of a carbon electrode for fuel cells. Examples of the cellulose fibers include henequen, kenaf, abaca, bamboo, hemp, flax, jute, pineapple, ramie, and sisal.

In (A-1), the cellulose fibers are cut and bound using an adhesive, thus forming a sheet. The cellulose fibers are split into microfibers having a diameter of tens to hundreds of □, and then cut to a length of 2~10 mm in a state of being immersed in liquid nitrogen. The reason why liquid nitrogen is used in the cutting of the cellulose fibers is that cutting of the cellulose fibers at room temperature using a tool may deform or clog the internal pores of the cellulose fibers due to pressure in the course of cutting. Thus, through cutting of the cellulose fibers in a state of being frozen in liquid nitrogen, the length of the fibers may be adjusted while maintaining the internal pores thereof.

Figure 2:
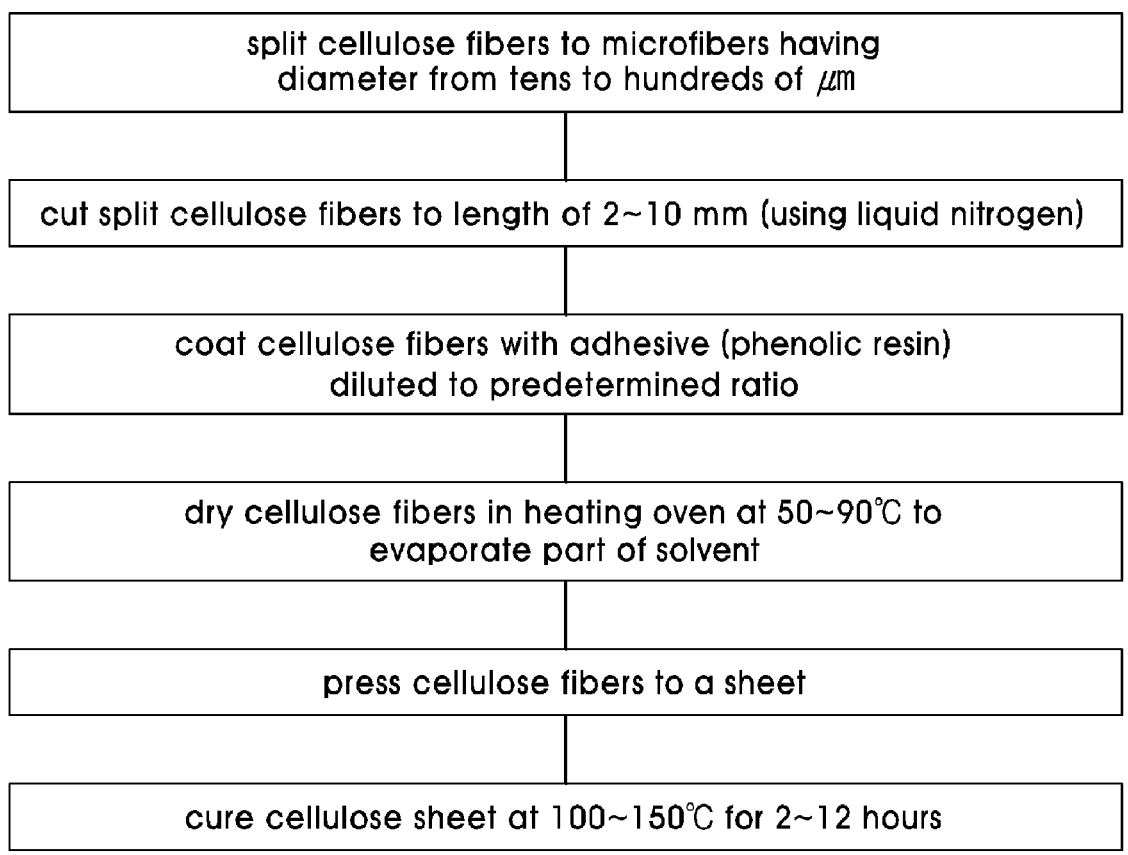
FIG. 2 is a flowchart for schematically showing a process of manufacturing a cellulose electrode by cutting cellulose fibers and pressing the cut fibers to a sheet in (A) of Example 1.

The cut cellulose fibers are mixed with phenolic resin diluted to a predetermined concentration, dried at 50~90□ to evaporate 50~80% solvent from the resin, and pressed, thus producing the cellulose sheet. As such, it is preferred that phenolic resin, which is commercially available, be diluted with a solvent such as methanol and thus used in a minimum amount. In the case where the concentration of phenolic resin is high, the internal pores of the cellulose fibers may be clogged. That is, the phenolic resin should be used in a low concentration and a minimum amount so as to merely function to bind the cellulose fibers while minimizing the clogging of the pores of the cellulose fibers. The pressed cellulose sheet is cured at 100~150□ for 2~12 hours. This procedure is summarized in FIG. 2.

In (A-2), the cellulose fibers are directly woven in the form of cloth. The cellulose fibers, serving as a raw material, are woven into cloth, thus producing the cellulose sheet. In order to use the cellulose fibers as fuel cell electrodes, the cellulose fibers should be split as fine as possible. As the diameter of the fibers is smaller, a woven form having a dense structure may be obtained. In the present invention, the cellulose fibers are split to a diameter ranging from tens to hundreds of □, due to the properties thereof. Depending on the end use, the woven cellulose sheet may be used alone, or two or three woven cellulose sheets are stacked and pressed, and thereby the surface area and porosity necessary for supporting the catalyst may be controlled and the reaction route in the fuel cell electrode reaction may be adjusted.

(B) is a pretreatment process for using the cellulose sheet as the electrode. The cellulose sheet obtained through (A-1) or (A-2) is heated to 500~1500□ at a heating rate of 5~20□/min in an atmosphere of hydrogen and nitrogen at 1:1, and is then maintained at 500~1500□ for a period of 30 min to 2 hours, thus manufacturing a carbonized cellulose electrode. In this procedure, impurities contained in the cellulose fibers are removed, thus decreasing the wall thickness of only the fibers, and the spaces in which the impurities (wax or fat component) have been present are maintained in the form of internal pores.

Subsequently, in order to increase the surface wettability of the cellulose electrode, the cellulose electrode is immersed in a 0.1~0.5 mol aqueous sulfuric acid solution and is then treated for 10~60 cycles at a sweep rate of 50 mV/s at −0.15~1.3 V. The concentration of the aqueous sulfuric acid solution varies depending on the material and structure of the cellulose electrode. If the concentration is lower than 0.1 mol, surface treatment effects are poor. Conversely, if the concentration exceeds 0.5 mol, the cellulose electrode may corrode. The voltage that is applied ranges from −0.15 V to 1.3 V, and the cellulose electrode may be damaged outside of the above voltage range. The treatment frequency is adjusted depending on the material of the electrode or the concentration of the sulfuric acid solution. If the treatment frequency is less than 10 cycles, almost no treatment effects may result. Conversely, if the treatment frequency is larger than 60 cycles, the surface may be damaged.

(C) is a process of doping the surface of the cellulose electrode, which is pretreated, with the catalyst metal for growing carbon nanotubes, such as nickel, cobalt, iron or a metal mixture thereof.

In (C-1), the cellulose electrode, which is treated with sulfuric acid and dried, is immersed in an aqueous solution of the precursor in which nitrate or acetate of nickel, cobalt, iron compound or mixture thereof is dissolved and then sonicated. Through 1~10 repetitions of a series of procedures including immersing the cellulose electrode, which has been treated with sulfuric acid and then dried, in an aqueous solution (0.1~1 mol) of nitrate or acetate of nickel, cobalt, iron, or mixture thereof used as the precursor and then performing sonication, the metal particles may be uniformly dispersed on the surface of the cellulose electrode. When the concentration of the precursor solution is less than 0.1 mol, it is difficult to dope the cellulose electrode with the metal. Conversely, when the concentration exceeds 1 mol, the amount of metal that is doped is large but the metal particles may be aggregated in the form of lumps. Further, the amount of metal that is doped on the surface of the cellulose electrode is increased in proportion to the immersion frequency. In the case where the immersion is repeated, drying under atmospheric conditions is inserted therebetween, so that the cellulose electrode may be effectively doped with the metal particles.

In (C-2) which is an alternative process to (C-1), an electrochemical process may be used to dope the surface of the cellulose electrode with the catalyst metal for growing carbon nanotubes, such as nickel, cobalt, iron or mixture thereof.

This process for doping the surface of the cellulose electrode with the metal particles includes connecting a saturated calomel electrode as a reference electrode, a platinum electrode as a counter electrode, and, as a working electrode, a cellulose electrode having a width of 4□ or less and a length of 20□ or less to be placed in the uniform temperature zone in a quartz tube, thus mounting a three-electrode cell; immersing the above electrodes in a 0.1~1 mol aqueous solution of nickel, cobalt, iron or mixture thereof and performing treatment for 10~600 cycles at a sweep rate of 10~50 mV/sec at a voltage ranging from −2.5 V to 2.5 V, thus controlling the amount of metal particles that are doped; and taking the cellulose electrode doped with nickel, cobalt, iron or mixture thereof out of the solution and then drying the cellulose electrode in a heating oven at 100~120□ for 12~24 hours.

If the voltage which is applied in the doping with nickel, cobalt, iron or mixture thereof falls outside of the range from −2.5 V to 2.5 V, the metal particles may aggregate, and thus the voltage is controlled within the range between two numerical values. The treatment frequency less than 10 cycles results in too small a doped amount, whereas the treatment frequency greater than 600 cycles results in a large doped amount but an increased particle size.

(D) is a process of supplying the gaseous carbon source to the surface of the cellulose electrode and maintaining an appropriate temperature, thereby growing the carbon nanotubes on the cellulose electrode.

Figure 3:
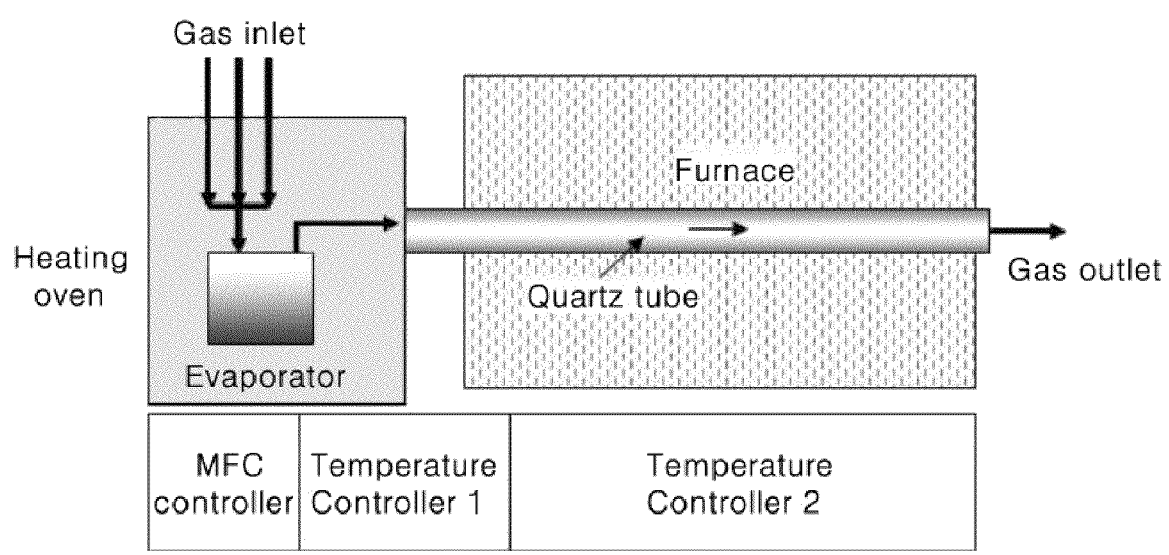
FIG. 3 is a view showing an apparatus which is used in the manufacture of the cellulose electrode according to the present invention.

The cellulose electrode doped with nickel, cobalt, iron or mixtures thereof is positioned at the center of a quartz tube located in a furnace in FIG. 3. The pressure inside the tube is reduced to 6~10 torr, and this state is maintained for 30 min or longer, thereby removing impurities from the quartz tube. Then, nitrogen (50~300 sccm (standard cubic centimeter per minute)) is allowed to flow into the tube at room temperature for 1 hour or longer, so that the state inside the tube becomes inactive. When the flow rate of nitrogen is less than 50 sccm, the flow in the quartz tube is non-uniform. Conversely, when the flow rate exceeds 300 sccm, it is difficult to realize a residence time required for the reaction.

Subsequently, in order to reduce nickel, cobalt, iron or metal mixture thereof which is in an oxide form, while hydrogen (30~150 sccm) is allowed to additionally flow, the temperature inside the tube is increased to a temperature (400~500□) at which the metal is reduced, and then maintained at that temperature for 2 hours, thus causing the complete reduction of the metal component. Subsequently, the temperature is continuously increased at an incremental rate of 10□/min. Then, when the temperature inside the quartz tube reaches 600~800□, at which the active growth of the carbon nanotubes occurs, the carbon source (2~300 sccm), such as methane, benzene, ethanol, or xylene, is supplied, so that the carbon nanotubes begin to grow on the surface of the cellulose electrode. When the number of carbon atoms in the molecule of the carbon source used is large, the flow rate is decreased to about 2~3 sccm. Conversely, when the number of carbon atoms is small, as in methane, a high flow rate of 100 sccm or more is preferably applied. This state is maintained for a period of time ranging from 10 min to 6 hours, and the reaction time is adjusted depending on the type of carbon source used and the desired growth morphology (length, density, thickness, etc.) of carbon nanotubes.

(E) is a process of removing the catalyst metal, such as nickel, cobalt, iron or metal mixture thereof, from the carbon nanotubes grown on the surface of the cellulose electrode and pretreating the surface of the carbon nanotubes to be supported with platinum.

In order to remove the catalyst metal, such as nickel, cobalt, iron or mixture thereof, from the carbon nanotubes grown on the surface of the cellulose electrode, hydrochloric acid treatment is conducted. The cellulose electrode on which the carbon nanotubes have been grown is immersed in a hydrochloric acid solution (6~10 mol), maintained for 6~24 hours, washed with distilled water, and then dried in a heating oven at 100~120□ for 12~24 hours. If the temperature of the heating oven is lower than 100□, it is difficult to remove moisture. Conversely, if the temperature is higher than 120□, the specimen may be deformed. Further, drying is preferably performed for a time period from 12 hours to 24 hours, thereby completely removing moisture. Also, when the concentration of the hydrochloric acid solution is less than 6 mol, treatment effects are deteriorated. In contrast, when the concentration is greater than 10 mol, the surface of the cellulose electrode may corrode.

Thereafter, in order to improve the surface wettability of the carbon nanotubes, to substitute the oxidizing group, and to make defects necessary for effective deposition of the catalyst, the specimen is immersed in an acid mixture solution (14 M nitric acid is mixed with 98% sulfuric acid at a volume ratio of 1:1), and is then treated for 5~360 min under reflux at 50~70□. When nitric acid and sulfuric acid of the acid mixture solution are mixed at a ratio of 1:1, the treatment effect thereof is excellent. Further, when the concentration of the acid mixture solution is less than the above value, the treatment effect becomes poor. Conversely, when the concentration is higher than the above value, serious surface corrosion may occur. Although the treatment effect is exhibited even at room temperature, the case where the temperature is 50□ or higher results in good treatment effects, and further, extreme evaporation of the acid mixture may take place above 70□. The treatment time varies depending on the structure of the carbon nanotubes and the cellulose electrode, and is adjusted within the range of about 5 min to form slight defects. If the treatment is performed for a period of time exceeding 360 min, the cellulose electrode and the carbon nanotubes may be seriously deformed. The treated specimen is washed several times with distilled water, and is then dried in a heating oven at 100~120□ for 12~24 hours to remove moisture.

(F) is a process of allowing the gaseous platinum precursor to flow to the carbon nanotubes grown on the surface of the cellulose electrode and supporting the platinum nano-catalyst thereon using CVD. The cellulose electrode, on which the carbon nanotubes have been grown, resulting from (E), is positioned at the center of the quartz tube, and, as in (C), the pressure inside the tube is maintained at 6~10 torr for 30 min at 100~120□, thus removing impurities from the quartz tube. Thereafter, while nitrogen (50~300 sccm) is allowed to flow into the tube, the flow thereof is maintained for 1 hour or longer. To support the platinum catalyst using CVD, the temperature inside the quartz tube is changed to 80~300□ at a heating rate of 10□/min. Then, when the above temperature reaches a reaction temperature, the gaseous platinum precursor is allowed to flow, so that the platinum particles are supported on the surface of the carbon nanotubes.

In order to support the platinum particles on the surface of the carbon nanotubes grown on the cellulose electrode, the platinum precursor (methyltrimethylcyclopentadienyl platinum) is placed in the evaporator in the heating oven positioned left in FIG. 3 and is then heated to 60~80□ to evaporate the precursor.

Thereafter, when the temperature of the precursor reaches a predetermined level, the flow path of nitrogen, which has been allowed to directly flow into the quartz tube, is changed so that nitrogen flows via the evaporator, whereby the gaseous platinum precursor is transferred to the cellulose electrode positioned in the quartz tube along the flow path of nitrogen used as a carrier gas. As such, the temperature of a connector for connecting the heating oven provided with the evaporator and the furnace for heating the quartz tube is equally maintained, and the point in time at which the platinum precursor begins to flow into the quartz tube is controlled to be the same as the point in time at which the temperature of the cellulose electrode reaches the reaction temperature.

Preferably, when the temperature of the precursor reaches 60~80□, the flow path of nitrogen (10~300 sccm) which has been allowed to directly flow into the quartz tube is changed so that nitrogen flows via the evaporator, thereby transferring the gaseous platinum precursor to the cellulose electrode positioned in the quartz tube along the flow path of nitrogen used as a carrier gas. In this case, the temperature of the connector for connecting the heating oven provided with the evaporator and the furnace for heating the quartz tube is also maintained at 60~80□, at which the complete evaporation of the precursor occurs, and the point in time at which the platinum precursor begins to flow into the quartz tube is adjusted to be the same as the point in time at which the temperature of the cellulose electrode reaches 80~300□, which is a reaction temperature. This temperature is maintained for a predetermined time (0.5~24 hours). The reaction time varies depending on the amount of platinum to be supported, and may be 24 hours or longer in the case where platinum is intended to be supported in a maximum amount.

Consequently, in the electrode according to the present invention, obtained by supporting the platinum nano-catalyst on the carbon nanotubes directly grown on the cellulose fibers, the manufacturing cost thereof can be considerably decreased compared to conventional carbon electrodes obtained by supporting platinum through impregnation and then applying carbon catalyst powder through a pasting method. Further, because the cellulose electrode has superior porosity and a large surface area, the reactive area of the electrode itself is greatly increased, and also, because the platinum nanoparticles are supported through CVD, even when the platinum precursor is used in a smaller amount, the electrode having superior performance can be manufactured. Accordingly, performance of fuel cell electrodes can be greatly improved. Therefore, the manufacturing method according to the present invention can be easily applied to the preparation of various catalysts or secondary cell electrodes.

A better understanding of the present invention may be obtained through the following examples, which are set forth to illustrate, but are not to be construed as the limit of the present invention.

EXAMPLE 1

(A) Henequen cellulose fibers were split into microfibers having a diameter ranging from tens to hundreds of □, and was then cut to a length of 2~10 mm in a state of being immersed in liquid nitrogen. As the cross-sectional diameter of the fibers used is smaller to the extent of ones of □, the fibers may be more favorably used for a fuel cell electrode reaction. However, in the present invention, the fibers were split to a diameter from tens to hundreds of □. In the case where the cellulose fibers are more finely split, the performance of the electrode may be advantageously improved. Then, the cut cellulose fibers was uniformly sprayed with phenolic resin diluted using a methanol solvent (dilution ratio of phenolic resin to methanol of 1:3~1:5), dried at 60□ to evaporate about 70% solvent from the resin, and then pressed in the form of a sheet, thereby obtaining a cellulose sheet. The pressed cellulose sheet was dried in a heating oven at 120□ for 10 hours and thus cured.

(B) The cellulose sheet obtained through (A) was heated to 700□ at a heating rate of 10□/min in an atmosphere of hydrogen and nitrogen at 1:1, and were then maintained at 700□ for 2 hours, thereby manufacturing a carbonized cellulose electrode. Thereafter, the cellulose electrode was immersed in a 0.1 mol aqueous sulfuric acid solution, and was then treated for 60 cycles at a sweep rate of 50 mV/s at −0.15~1.3 V.

(C) The cellulose electrode, which had been treated with sulfuric acid and then dried, was immersed in a 0.1 mol aqueous solution of a nickel nitrate or acetate precursor, and was then sonicated. Through three repetitions of these procedures, the metal particles were uniformly dispersed on the surface of the cellulose electrode.

(D) The cellulose electrode doped with the nickel particles was positioned at the center of a quartz tube located in a furnace of FIG. 3, and the pressure inside the quartz tube was reduced to 10 torr and was then maintained for 30 min or longer so that impurities were removed from the quartz tube. Thereafter, nitrogen was allowed to flow into the tube at 100 sccm at room temperature for 1 hour or longer, and thus the state inside the quartz tube was made inactive.

Subsequently, in order to reduce nickel metal in an oxide form, while hydrogen was additionally supplied at 100 sccm, the temperature inside the tube was increased to 500□, capable of reducing the metal component, and was then maintained at that temperature for 2 hours, thus causing the metal component to be completely reduced. Subsequently, the temperature was continuously increased at an incremental rate of 10□/min. Then, when the temperature reached 700□, acetylene was supplied at 2 sccm, and the carbon nanotubes were thus grown on the surface of the cellulose electrode.

(E) In order to remove the nickel metal catalyst from the carbon nanotubes grown on the surface of the cellulose electrode, the cellulose electrode was immersed in a 6 mol hydrochloric acid solution, maintained for 24 hours, washed with distilled water, and then dried in a heating oven at 110□ for 12 hours.

Thereafter, the specimen was immersed in an acid mixture solution of 14 M nitric acid and 98% sulfuric acid mixed at a volume ratio of 1:1 and was then treated for 5 min under reflux at 50~70□.

(F) The cellulose electrode having the carbon nanotubes grown thereon, resulting from (A)~(E), was positioned at the center of the quartz tube, and the pressure inside the tube was maintained at 10 torr for 30 min at 110□, as in (C), so that the impurities were removed from the quartz tube. While nitrogen was allowed to flow into the tube at 100 sccm, the flow of nitrogen was maintained for 1 hour or longer. In order to support the platinum catalyst using CVD, the temperature inside the quartz tube was changed to 140□ at a heating rate of 5□/min. Then, when the temperature reached the reaction temperature, the gaseous platinum precursor was allowed to flow into the tube so that the platinum particles were supported on the surface of the carbon nanotubes. As such, the reaction temperature used corresponds to the most preferable conditions for CVD of the platinum nano-catalyst as disclosed in Korean Patent Application No. 10-2007-0015801.

The platinum precursor (methyltrimethylcyclopentadienyl platinum) was placed in the evaporator in the heating oven shown left in FIG. 3, and was then heated to 60□, thus evaporating the precursor. When the temperature of the precursor reached 60□, the flow path of 100 sccm of nitrogen, which had been allowed to directly flow into the quartz tube, was changed so that nitrogen was supplied via the evaporator, thereby transferring the gaseous platinum precursor to the cellulose electrode positioned in the quartz tube along the flow path of nitrogen used as a carrier gas. As such, the temperature of the connector for connecting the heating oven provided with the evaporator and the furnace for heating the quartz tube was also maintained at 60□, at which the complete evaporation of the precursor was caused. The point in time at which the platinum precursor began to flow into the quartz tube was controlled to be the same as the point in time at which the temperature of the cellulose electrode was 140□ which is a reaction temperature. This temperature was maintained for 2 hours.

EXAMPLE 2

(A) The same process as in (A) of Example 1 was conducted.

(B) The same process as in (B) of Example 1 was conducted.

(C) As a reference electrode, a saturated calomel electrode, a platinum electrode as a counter electrode, and as a working electrode, a cellulose electrode having a 4□ (width)×4 cm (length) to be placed in the uniform temperature zone in a quartz tube were connected, thus mounting a three-electrode cell. The above electrodes were immersed in a 0.1 mol aqueous nickel solution and then treated for 60 cycles at a sweep rate of 50 mV/sec in a voltage range from −2.5 V to 2.5 V. Subsequently, the cellulose electrode doped with the nickel particles was taken out of the solution and then dried in a heating oven at 110□ for 12 hours, thereby doping the surface of the cellulose electrode with the metal particles.

(D) The same process as in (D) of Example 1 was conducted.

(E) The same process as in (E) of Example 1 was conducted.

(F) The same process as in (F) of Example 1 was conducted.

Through (A)~(F), the cellulose electrode for fuel cells having the platinum catalyst supported thereon according to the present invention was manufactured.

EXAMPLE 3

(A) Henequen cellulose fibers were split to have a diameter from tens to hundreds of □, and then woven in the form of cloth, after which two sheets thereof were stacked and pressed using phenolic resin.

(B) The same process as in (B) of Example 1 was conducted.

(C) The same process as in (C) of Example 1 was conducted.

(D) The same process as in (D) of Example 1 was conducted.

(E) The same process as in (E) of Example 1 was conducted.

(F) The same process as in (F) of Example 1 was conducted.

Through (A)~(F), the cellulose electrode for fuel cells having the platinum catalyst supported thereon according to the present invention was manufactured.

Figure 4:
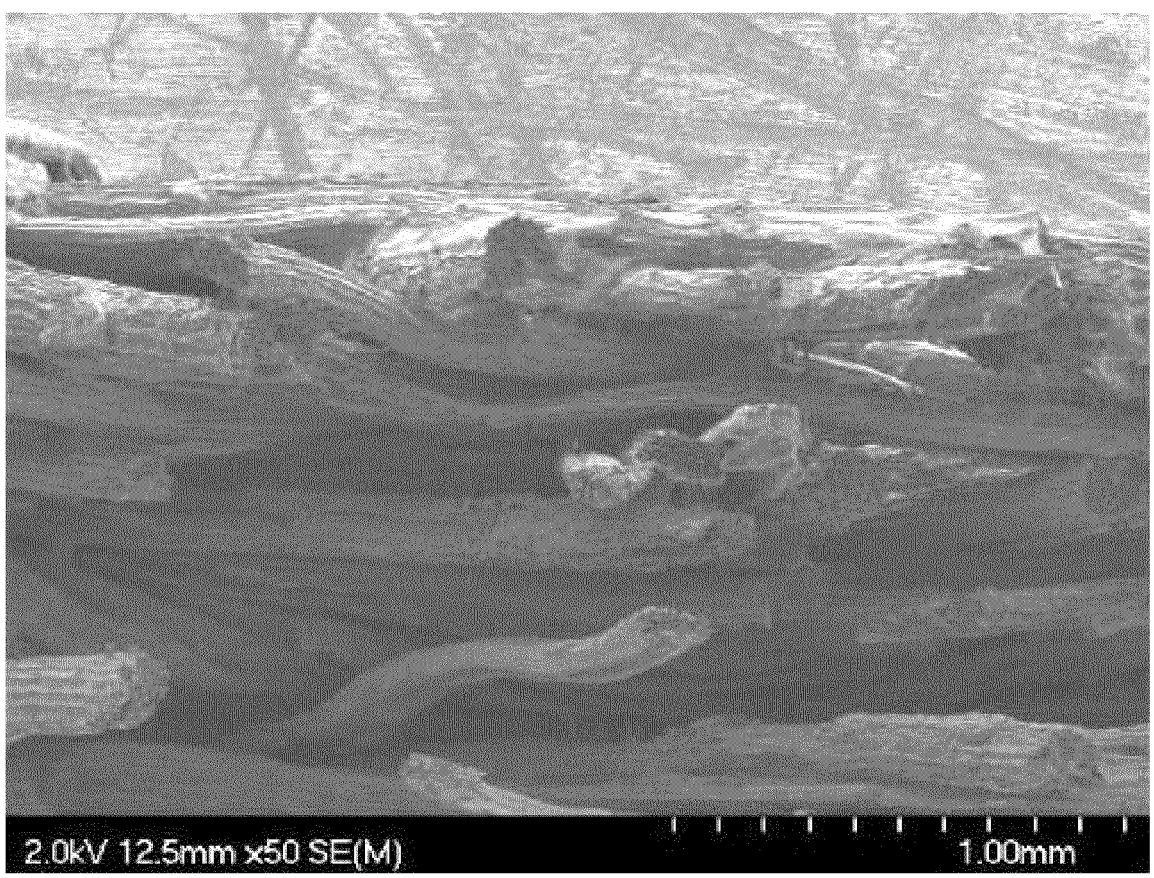
FIG. 4 is a scanning electron microscope (SEM) image showing the cellulose sheet resulting from cutting of the cellulose fibers in (A) of Example 1.
Figure 5:
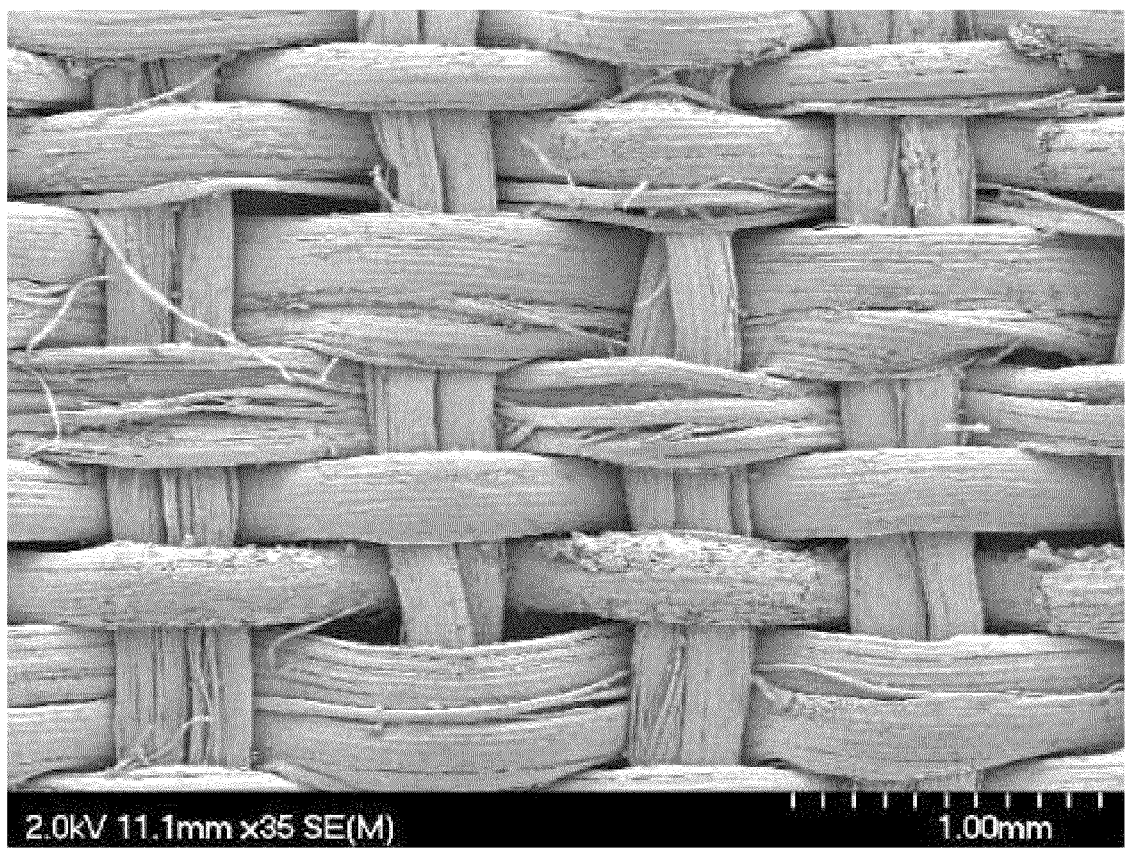
FIG. 5 is an SEM image showing the cellulose sheet in the form of cloth resulting from weaving of the cellulose fibers in (A) of Example 3.

The cellulose sheet resulting from (A) of Example 1 was observed using an SEM. The results thereof are shown in FIG. 4. The cellulose sheet resulting from (A) of Example 3 was observed using an SEM. The results thereof are shown in FIG. 5. As is apparent from FIGS. 4 and 5, the cellulose sheet had a thickness of about 1 mm, due to manual working. The cellulose sheet may be manufactured into commercial electrode products having a thickness of 200~500□.

Figure 6:
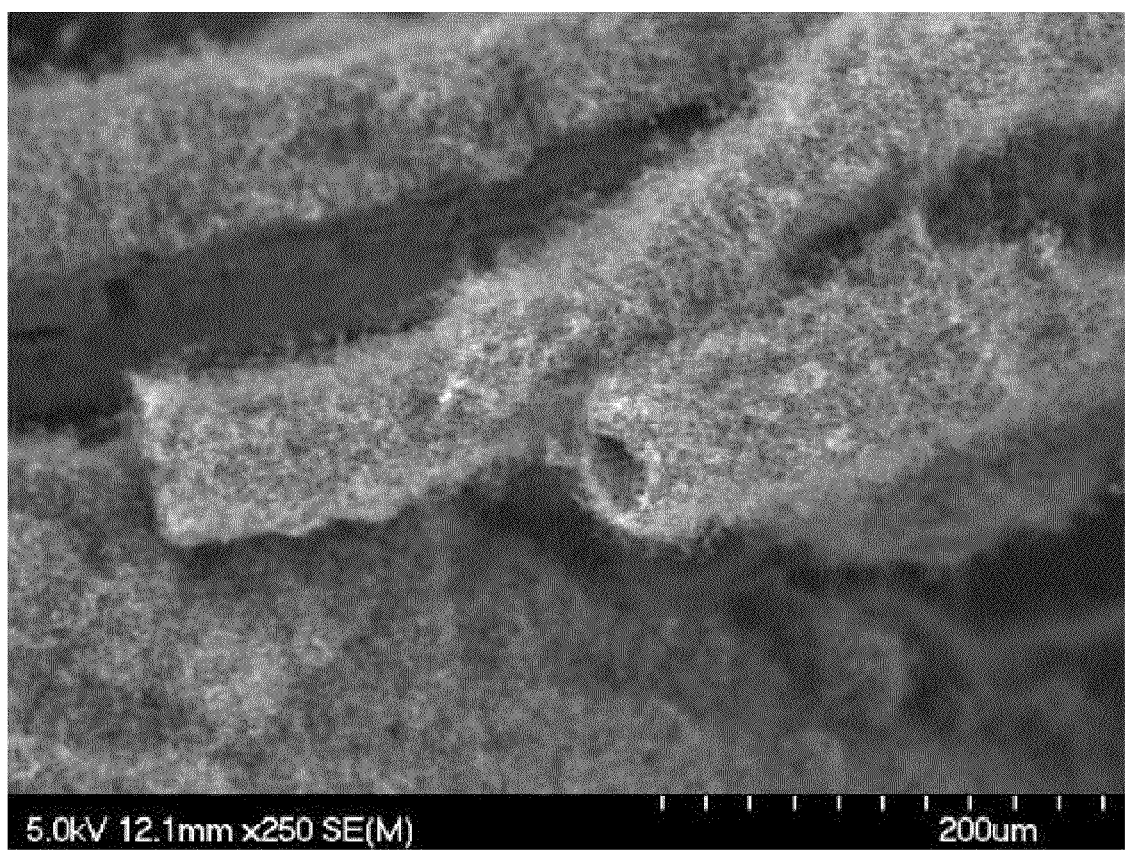
FIG. 6 is an SEM image showing the surface of the cellulose electrode resulting from growth of carbon nanotubes on the cellulose electrode in (D) of Example 1.
Figure 7:
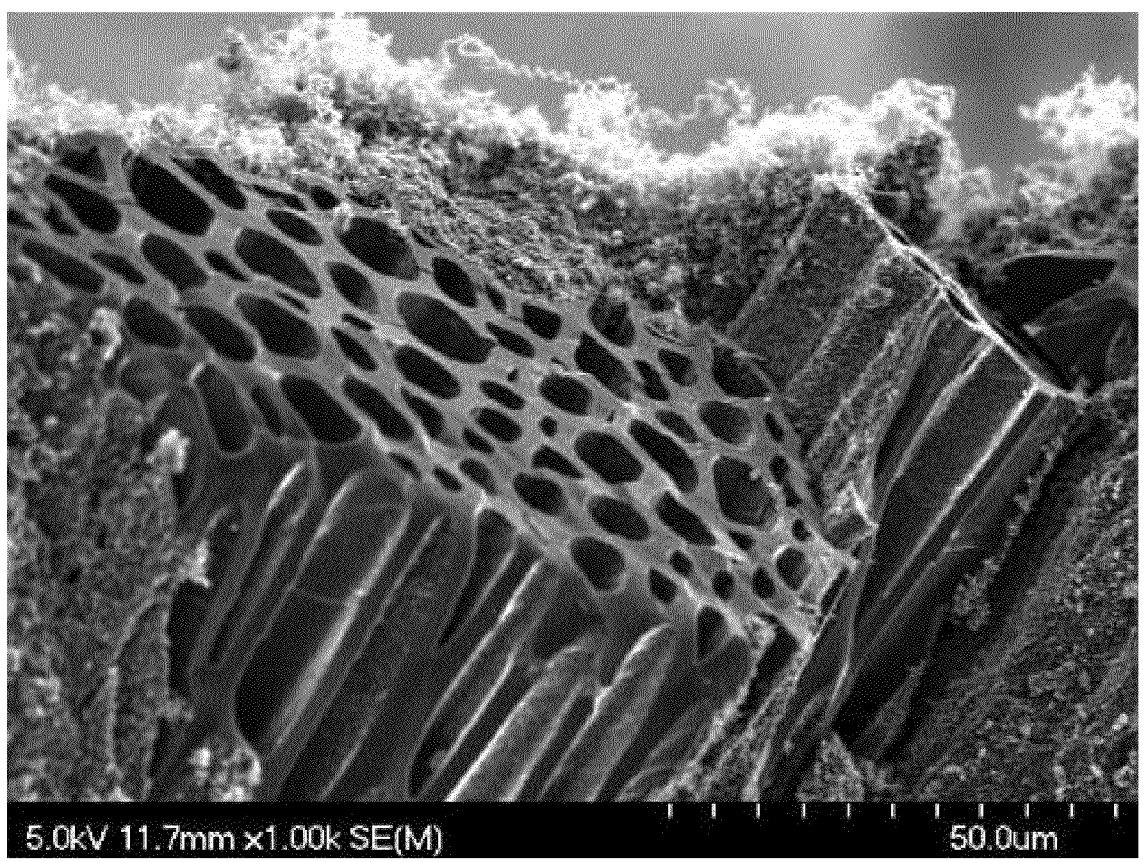
FIG. 7 is an SEM image showing the cross-section of the cellulose electrode resulting from growth of carbon nanotubes on the cellulose electrode in (D) of Example 1.
Figure 8:
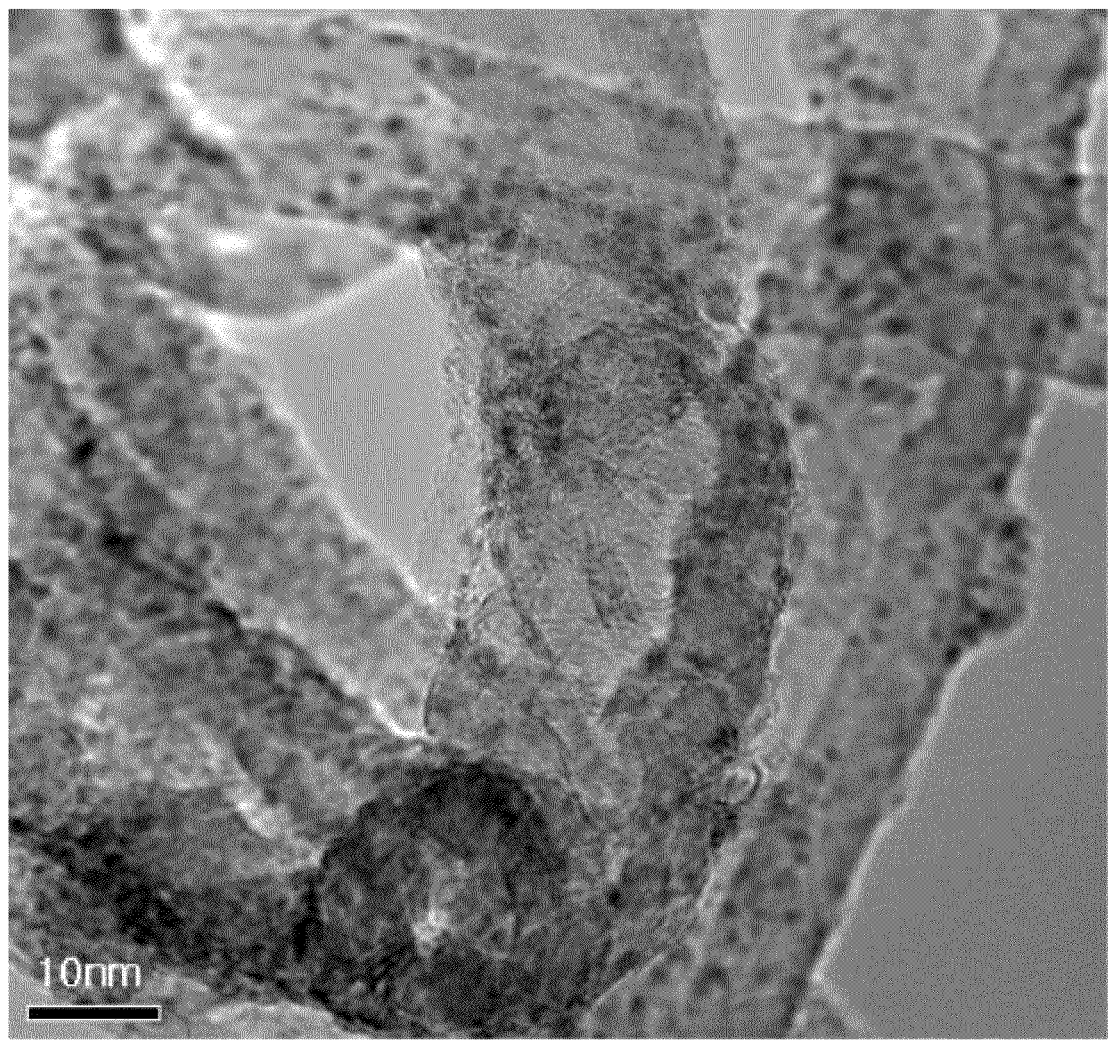
FIG. 8 is a transmission electron microscope image showing the surface of the cellulose electrode resulting from supporting of a platinum nano-catalyst on the carbon nanotubes grown on the cellulose electrode in (F) of Example 1.

The carbon nanotubes grown on the surface of the cellulose electrode resulting from (A)~(D) of Example 1 were observed using an SEM. The results are shown in FIGS. 6 and 7. FIG. 6 shows the surface of the cellulose electrode, and FIG. 7 shows the cross-section of the cellulose electrode. In the cellulose electrode having the platinum nano-catalyst supported thereon, obtained through (A)~(F) of Example 1, the shape of the platinum catalyst was observed using a transmission electron microscope. The results are shown in FIG. 8. From this drawing, the platinum nano-catalyst in a high dispersion state could be seen, and the size thereof was about 1 nm, which is evaluated to be excellent in the art.

As described hereinbefore, the present invention provides a method of manufacturing a cellulose electrode using direct growth of carbon nanotubes and chemical vapor deposition for supporting a platinum nano-catalyst, a cellulose electrode manufactured thereby, and use of cellulose fibers as fuel cell electrodes. According to the present invention, a novel cellulose electrode having high functionality is developed to substitute for carbon paper which is a conventional fuel cell electrode material. The price of the cellulose material is 1/4000 of that of carbon fibers used in the conventional carbon paper, and the electrode manufacturing cost using the cellulose material is remarkably reduced to the level of about 1/130. In the present invention, in order to manufacture the fuel cell electrode using the cellulose sheet, direct growth of carbon nanotubes having superior electrical, physical, and chemical properties on the surface of the cellulose electrode formed of cellulose fibers is used instead of a conventional electrode manufacturing process, for example, a pasting process for applying a platinum-supported carbon catalyst on carbon paper, thereby eliminating problems caused by the conventional pasting process in which the platinum-supported catalyst particles are overlapped to thus block the catalytic active sites thereof in the course of pasting. Further, large surface area and high electrical conductivity of the carbon nanotubes can be maximally utilized, and it is easy to discharge water which is a by-product generated during the operation of the fuel cell due to vertical orientation of the carbon nanotubes on the carbon paper, considerably increasing the durability of the electrode.

In the present invention, the supporting of the platinum nano-catalyst on the cellulose electrode having the carbon nanotubes grown thereon can be conducted using CVD which is disclosed in Korean Patent Application No. 10-2007-0015801, thereby realizing the supporting of the nanoparticles having a size of about 1~2 nm. Ultimately, conventional expensive carbon paper can be replaced with the inexpensive cellulose sheet, resulting in high value-added products. In particular, the reactive area of the electrode is increased, and the size of the catalyst particles is decreased, thus improving the performance of the fuel cell electrode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a cellulose electrode having a platinum nano-catalyst supported thereon, comprising:
   splitting cellulose fibers, freezing the split cellulose fibers, cutting the split cellulose fibers while frozen to a predetermined length, and connecting the split cellulose fibers to each other, thus producing a cellulose sheet;
   growing carbon nanotubes on the cellulose sheet; and
   supporting a platinum nano-catalyst on the cellulose sheet having the carbon nanotubes grown thereon.

2. The method as set forth in claim 1, wherein the producing the cellulose sheet comprises (A-1) splitting the cellulose fibers into fibers on a micrometer scale, cutting the split fibers to the predetermined length, and connecting the cellulose fibers to each other by binding the cut fibers, or (A-2) directly weaving the cellulose fibers, thus producing the cellulose sheet.

3. The method as set forth in claim 1, wherein the cellulose fibers are selected from the group consisting of henequen, kenaf, abaca, bamboo, hemp, flax, jute, pineapple, ramie, and sisal.

4. The method as set forth in claim 1, wherein the growing the carbon nanotubes comprises (C) doping a surface of the cellulose sheet, which is pretreated, with a catalyst metal for growing carbon nanotubes and (D) supplying a carbon source to the surface of the cellulose electrode doped with the catalyst metal for growing carbon nanotubes, thus growing the carbon nanotubes on the cellulose electrode, and the supporting the platinum nano-catalyst on the cellulose sheet having the carbon nanotubes grown thereon comprises (E) removing the catalyst metal for growing carbon nanotubes from the carbon nanotubes grown on the surface of the cellulose electrode and pretreating the carbon nanotubes grown on the surface of the cellulose electrode to be supported with platinum and (F) supporting the platinum nano-catalyst on the surface of the carbon nanotubes grown on the surface of the cellulose electrode using chemical vapor deposition.

5. The method as set forth in claim 4, wherein the catalyst metal for growing carbon nanotubes used in (C) is used in a form of an aqueous solution in which any one or a mixture of two or more selected from the group consisting of nickel, cobalt, and iron is contained as a precursor.

6. The method as set forth in claim 4, wherein the pretreating the carbon nanotubes in (E) is conducted through treatment using a hydrochloric acid solution, water washing, drying, and treatment using an acid mixture solution of nitric acid and sulfuric acid at 50-70° C. for 5-360 minutes.

7. A method of manufacturing a cellulose electrode having a platinum nano-catalyst supported thereon, comprising:
   splitting cellulose fibers into fibers on a micrometer scale, freezing the cellulose fibers, cutting the split fibers while frozen to a predetermined length, and subjecting the cut fibers to binding, drying, and pressing to a sheet, thus producing a cellulose sheet;
   thermally treating the cellulose sheet, thus manufacturing a carbon electrode for fuel cells;
   doping the cellulose sheet with a catalyst metal for growing carbon nanotubes, and then supplying a carbon source to the cellulose sheet doped with the catalyst metal for growing carbon nanotubes at a predetermined temperature, thus directly growing the carbon nanotubes on the cellulose sheet; and
   pretreating the cellulose sheet having the carbon nanotubes grown thereon with an acid, and then supporting the platinum nano-catalyst on the cellulose sheet having the carbon nanotubes grown thereon using chemical vapor deposition.

8. The method as set forth in claim 1, further comprising (B) pretreating the cellulose sheet with heat.

9. The method as set forth in claim 8, wherein the cellulose sheet is heated to 500-1500° C. at a heating rate of 5-20° C./minute in an atmosphere of hydrogen and nitrogen and maintained at 500-1500° C. for a period of 20 minutes to 2 hours.

10. The method as set forth in claim 1, wherein the split cellulose fibers are frozen in liquid nitrogen.

11. A method of manufacturing a cellulose sheet, comprising:
    splitting cellulose fibers into fibers on a micrometer scale;
    cutting the split cellulose fibers to a predetermined dimension;
    coating the cellulose fibers with an adhesive diluted in a solvent;
    drying the cellulose fibers coated with the adhesive at a temperature between 50° C. and 90° C. to evaporate a portion of the solvent;
    pressing the cellulose fibers coated with the adhesive; and
    curing the pressed cellulose fibers coated with the adhesive at a temperature between 100° C. and 150° C. for between 2 and 12 hours.

12. The method as set forth in claim 11, wherein the cellulose fibers are selected from the group consisting of henequen, kenaf, abaca, bamboo, hemp, flax, jute, pineapple, ramie, and sisal.

13. The method as set forth in claim 11, wherein the split cellulose fibers are cut to a length between 2 and 10 mm, and wherein phenolic resin is used as the adhesive, and wherein the cured fibers are heated to a temperature between 500° C. and 1500° C. in an atmosphere of hydrogen and nitrogen for between 30 minutes and 2 hours to pretreat the cellulose sheet.

14. The method as set forth in claim 11, wherein the adhesive is phenolic resin, and the adhesive is diluted with methanol.

* * * * *